United States Patent
Gong et al.

(10) Patent No.: US 11,506,152 B2
(45) Date of Patent: Nov. 22, 2022

(54) CARBON CANISTER

(71) Applicants: MAHLE Automative Technologies (China) Co. Ltd., Shanghai (CN); MAHLE International GmbH, Stuttgart (DE)

(72) Inventors: Zonghai Gong, Shanghai (CN); Yongsheng Li, Shanghai (CN); Hui Zhang, Shanghai (CN)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/472,514

(22) Filed: Sep. 10, 2021

(65) Prior Publication Data

US 2022/0074372 A1    Mar. 10, 2022

(51) Int. Cl.
  *F02M 25/08* (2006.01)
  *B01D 53/04* (2006.01)

(52) U.S. Cl.
  CPC ..... *F02M 25/0854* (2013.01); *B01D 53/0407* (2013.01); *B01D 2253/102* (2013.01); *B01D 2259/4516* (2013.01)

(58) Field of Classification Search
  CPC ........... F02M 25/0854; B01D 53/0407; B01D 2259/45
  See application file for complete search history.

(56) References Cited

U.S. PATENT DOCUMENTS

| | | | | |
|---|---|---|---|---|
| 8,459,240 B2* | 6/2013 | Lee | ............ | B01D 53/0415 123/518 |
| 9,222,446 B2* | 12/2015 | Reddy | ............ | F02M 25/089 |
| 11,239,001 B2* | 2/2022 | Liu | ............ | G21K 1/003 |
| 11,261,770 B1* | 3/2022 | Delleree | ............ | F02B 33/40 |
| 2005/0178368 A1* | 8/2005 | Donahue | ............ | F02M 35/10019 123/520 |
| 2008/0308074 A1* | 12/2008 | Allen | ............ | F02M 33/08 123/519 |
| 2012/0073549 A1* | 3/2012 | Lee | ............ | B01D 53/0415 123/520 |
| 2013/0160877 A1* | 6/2013 | Walter | ............ | F02M 37/025 137/565.22 |
| 2013/0263741 A1* | 10/2013 | Mani | ............ | F02M 25/0854 96/112 |
| 2019/0331064 A1* | 10/2019 | Asanuma | ............ | F02M 25/08 |
| 2020/0208580 A1* | 7/2020 | Kato | ............ | F02M 35/10222 |
| 2022/0074372 A1* | 3/2022 | Gong | ............ | F02M 25/0854 |

* cited by examiner

*Primary Examiner* — Logan M Kraft
*Assistant Examiner* — Anthony L Bacon
(74) *Attorney, Agent, or Firm* — Falk Ewers; Ewers IP Law PLLC

(57) ABSTRACT

A carbon canister includes a main body with a chamber containing activated carbon, an end cover mounted to the main body, the end cover and the main body enclosing and forming a cavity, the end cover having a desorption port for connecting with and engine, a Venturi tube mounted in the cavity and including an inlet segment, and a throat and a back suction tube. An inner diameter of the throat is smaller than an inner diameter of the inlet segment. The inlet segment communicates with the activated carbon containing chamber, the throat communicates with the desorption port, the back suction tube connects to the throat, and the back suction tube extends to the bottom of the cavity. Thereby, a negative pressure is created, the fuel collected within the carbon canister is desorbed to the engine so that the fuel utilization is improved, and the exhaust emission is reduced.

10 Claims, 2 Drawing Sheets

CARBON CANISTER

CROSS REFERENCE TO RELATED APPLICATIONS

This application claims priority to Chinese patent application CN 202021970520.2, filed Sep. 10, 2020, the entire content of which is incorporated herein by reference.

TECHNICAL FIELD

The present disclosure belongs to the field of auto parts, and in particular to a carbon canister.

BACKGROUND

Due to the pollution of motor vehicle exhaust to the environment, the national requirements for exhaust emission are increasingly strict. Especially with the issuance of the "National VI" standard, the emission index of fuel cars has become more stringent. The functionality of the fuel supply system is increasingly important in the case that the combustion efficiency of the engine has reached its peak.

The carbon canister in the prior art has the following disadvantages:

(1) During the desorption of the carbon canister, some of the fuel vapor is collected in the housing of the carbon canister after forming droplets, which is difficult to be combusted and utilized by an engine or the utilization efficiency is extremely low. Thus, more volume of carbon powder or carbon powder with stronger function is needed to absorb the volatilized fuel vapor so as to reduce the exhaust emission and meet with the strict emission standard, which increases the cost of the carbon canister.

(2) When the carbon canister is mounted at a position lower than the fuel tank, the fuel tends to flow into the carbon canister and combines with the carbon powder, so that the working capacity of the carbon powder is deteriorated. The carbon canister below the fuel tank thus requires a larger volume than the carbon canister above the fuel tank. The carbon canister is difficult to be generalized among different vehicle models on the same platform, which increases the fabrication cost.

SUMMARY

The present disclosure is directed to provide a carbon canister, so that the fuel which is formed into droplets and then collected in the housing of the carbon canister can be effectively utilized, and desorbed to an engine to be combusted.

The present disclosure provides a carbon canister which includes:

a main body formed with an activated carbon containing chamber containing activated carbon;

an end cover mounted to the main body, wherein the end cover and the main body enclose and thus form a cavity, and the end cover is provided with a desorption port which is used for connecting with an engine;

a Venturi tube mounted in the cavity and comprising an inlet segment, a throat and a back suction tube, wherein an inner diameter of the throat is smaller than an inner diameter of the inlet segment, the inlet segment communicates with the activated carbon containing chamber, the throat communicates with the desorption port, the back suction tube connects to the throat, and the back suction tube extends to the bottom of the cavity.

Typically, the Venturi tube further comprises a diffusion segment connected to the throat and the desorption port, the inner diameter of the throat is smaller than an inner diameter of the diffusion segment.

Typically, the inlet segment, the throat and the diffusion segment extend in a straight line.

Typically, an inner wall of the diffusion segment tapers into a truncated cone shape in a direction of an open end of the diffusion segment towards the throat.

Typically, an inner wall of the inlet segment tapers into a truncated cone shape in a direction of an open end of the inlet segment towards the throat.

Typically, an inner wall of the back suction tube tapers into a truncated cone shape in a direction of an end of the back suction tube towards the throat.

Typically, an inner diameter of the back suction tube is less than 1 mm at a position where the inner diameter of the back suction tube is the smallest.

Typically, the end of the back suction tube is provided with a convex portion that extends toward a platform portion at the bottom of the cavity, so that a gap is formed between the end of the back suction tube and the platform portion.

Typically, the Venturi tube is provided with a limiting portion which is located at the inlet segment and the diffusion segment, the limiting portion cooperates with the main body and the end cap to prevent the Venturi tube from rotating about an axis of the throat.

Typically, the inlet segment and the diffusion segment are identical in structure after the Venturi tube is rotated 180 degrees about an axis of the back suction tube.

Through adopting above-mentioned technical scheme, a negative pressure is created by the Venturi tube, the fuel collected within the carbon canister is desorbed to the engine by the back suction tube and then combusts, so that the fuel utilization is improved, and the exhaust emission of per unit of fuel is reduced.

BRIEF DESCRIPTION OF THE DRAWINGS

The invention will now be described with reference to the drawings wherein.

DESCRIPTION OF EXEMPLARY EMBODIMENTS

In order to more clearly illustrate the above objects, features and advantages of the present disclosure, exemplary embodiments of the present disclosure are described in this section with reference to the drawings. The present disclosure can be implemented in other different ways except for various exemplary embodiments explained in this section. One skilled in the art may make corresponding improvements, modifications and replacements without departing from the spirit of the present disclosure, and thus the present disclosure is not limited by the specific exemplary embodiments disclosed in this section. The scope of protection of the present disclosure shall be subject to the claims.

As shown in FIGS. 1 to 4, the present disclosure provides a carbon canister, including a main body 1, an end cap 2 connecting to an end of the main body 1 and enclosing a cavity 4 with the main body 1, and a Venturi tube 3 mounted to the cavity 4.

Figure 1:
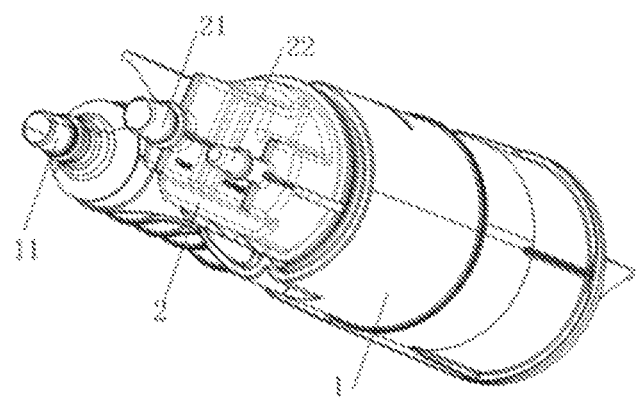
FIG. 1 shows a schematic structural view of a canister according to an exemplary embodiment of the present disclosure.
Figure 2:
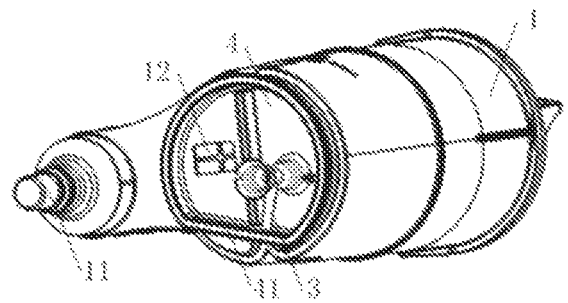
FIG. 2 shows a schematic structural view of a carbon canister without an end cap according to an exemplary embodiment of the present disclosure.
Figure 3:
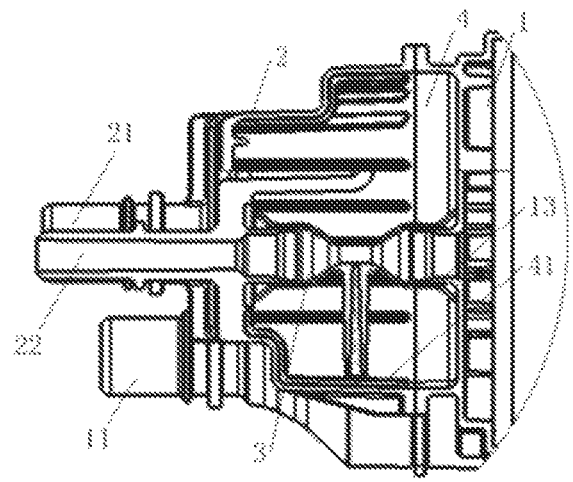
FIG. 3 shows a partial cross-sectional view of a carbon canister according to an exemplary embodiment of the present disclosure.

As shown in FIGS. 1 to 3, the main body 1 is formed with an activated carbon containing chamber for containing activated carbon. The main body 1 is provided with an atmospheric communication port 11, through which air can enter the activated carbon containing chamber filled with activated carbon.

The main body 1 is also provided with a first through hole 12 and a second through hole 13, each of which communicates with the activated carbon containing chamber. The first through hole 12 communicates with an absorption port 21 described later, and the second through hole 13 communicates with a desorption port 22 described later by the Venturi tube 3.

As shown in FIGS. 1 and 3, the end cap 2 is mounted at an end of the main body 1. The end cap 2 is positioned outside the activated carbon containing chamber, and the end cap 2 and the main body 1 enclose and thus form a cavity 4. The end cap covers the first through hole 12 and the second through hole 13 with the end cap 2 mounted to the main body 1.

The cavity 4 includes a platform portion 41, which is for example formed by at least one of the main body 1 and the end cap 2. The platform portion 41 can be planar. In a state where the carbon canister is mounted to the vehicle, the platform portion 41 is positioned at the bottom of the cavity 4, and the droplets within the cavity 4 can be collected on the platform portion 41 due to gravity.

The End cap 2 is provided with the adsorption port 21 and the desorption port 22, and the adsorption port 21 communicates with the activated carbon containing chamber through the first through hole 12. The adsorption port 21 is used for connecting a fuel tank, and fuel vapor in the fuel tank can enter the activated carbon containing chamber filled with activated carbon through a pipeline. The fuel vapor can be mixed with the air entered into the activated carbon containing chamber through the atmospheric communication port 11 and then stored in activated carbon.

The desorption port 22 is connected to the second through hole 13 through the Venturi tube 3, and the desorption port 22 is used for connecting an engine. After the engine is started, the mixed gas of fuel vapor and air stored in activated carbon is desorbed to the engine through the Venturi tube 3 for combustion. It is understood that part of the fuel vapor in the fuel tank and the conduit connecting the fuel tank and the carbon canister may cool and form droplets and collect within the cavity 4, for example on the platform portion 41. In particular in the case of the position of the fuel tank higher than that of the carbon canister, the phenomenon of collection of fuel droplets in the cavity 4 is more remarkable.

Figure 4:
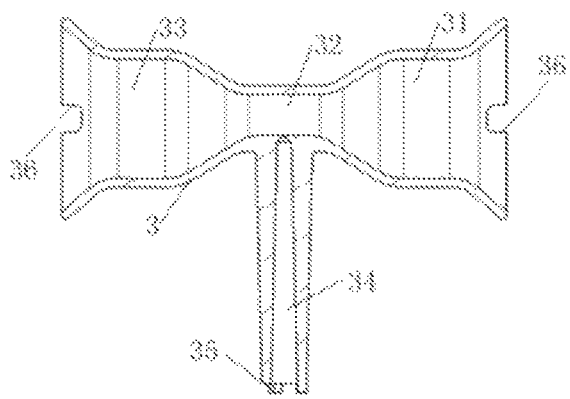
FIG. 4 shows a schematic structural view of a Venturi tube of a carbon canister according to an exemplary embodiment of the present disclosure.

As shown in FIGS. 2 to 4, the Venturi tube 3 includes an inlet segment 31, a throat 32, a diffusion segment 33, and a back suction tube 34. The inlet segment 31 and the diffusion segment 33 are connected via the throat 32 which is between the inlet segment 31 and the diffusion segment 33. The inner diameter of the throat 32 is smaller than the inner diameter of the inlet segment 31, and the inner diameter of the throat 32 is smaller than the inner diameter of the diffusion segment 33. The inlet segment 31, the throat 32 and the diffusion segment 33 can form as a passage extending in a straight line. The inlet segment 31 is connected to the second through hole 13 of the main body 1, and the inlet segment 31 can be fixedly connected with the main body 1 by interference fit. The diffusion segment 33 is connected to the end cap 2, and the diffusion segment 33 can be fixedly connected with the end cap 2 by interference fit.

The inner wall of the diffusion segment 33 can be formed in a cylindrical shape. The inner wall of the inlet segment 31 tapers into a truncated cone shape in the direction of the open end of the inlet segment 31 towards the throat 32. The inner wall of the diffusion segment 33 tapers into a truncated cone shape in the direction of the open end of the diffusion segment 33 towards the throat 32.

The back suction tube 34 is connected to the throat 32, with the back suction tube 34 extending toward the platform portion 41. The back suction tube 34 can be perpendicular to the throat 32, making the Venturi tube 3 shaped as a T-shaped three-way tube.

It is understood that, when the engine is started, the carbon canister is desorbed, and the mixed gas of fuel vapor and air adsorbed by activated carbon passes through the inlet segment 31, the throat 32 and the diffusion segment 33 in sequence and towards the desorption port 22. Since the throat 32 has a smaller inner diameter than the inlet segment 31 and the diffusion segment 33, a negative pressure can be created in the throat 32, such that an airflow flowing to the throat 32 can be formed inside the back suction tube 34. The fuel droplets collected on the platform portion 41 of the cavity 4 can be sucked into the throat 32 through the back suction tube 34, and then enter the engine through the diffusion segment 33 and the desorption port 22 for combustion, which improves the fuel utilization and fuel economy.

As shown in FIG. 4, the inner wall of the back suction tube 34 tapers into a truncated cone shape in the direction of the end of the back suction tube 34 towards the throat 32. It is easier to suck the fuel droplets collected on the bottom of the cavity 4 to the throat 32 by the inner wall of the back suction tube 34 being formed into a truncated cone shape.

The inner diameter of the back suction tube 34 is the smallest at the portion where the back suction tube 34 connects with the throat 32. The inner diameter of the back suction tube 34 can be smaller than 1 mm at the position where the inner diameter of the back suction tube 34 is the smallest, so that the liquid sucked up through the back suction tube 34 can be atomized under the action of the airflow. The atomized fuel can be mixed with air and then enter the engine, so that the fuel can be combusted completely easily, which further improves the fuel utilization and fuel economy. It is understood that the minimum inner diameter portion of the back suction tube 34 can be formed by the abrupt narrowing of the inner wall of the back suction tube 34 or the tapering of the inner wall of the back suction tube 34.

Further, the end of the back suction tube 34 can be provided with one or more convex portion 35, which extends toward the platform portion 41 and may contact the platform portion 41 so that the droplets collected on the platform portion 41 is easily absorbed through the back suction tube 34. The convex portion 35 can prevent the end of the back suction tube 34 from completely contacting the platform portion 41 which causes the inside and outside of the back suction tube 34 separated and no droplet sucked into the back suction tube 34.

Further, the inlet segment 31 and the diffusion segment 33 are provided with a limiting portion 36, for example the limiting portion can be a groove. The groove-shaped limiting portion 36 can reduce raw materials used for fabrication of the Venturi tube 3, thereby reducing the cost. The main body 1 and the end cap 2 are provided with a convex portion which cooperates with the groove-shaped limiting portions 36, and the convex portion can be fitted into the limiting portion 36. The limiting portion 36 can prevent the Venturi tube 3 from rotating about the axis of the throat 32. If the Venturi tube 3 rotates about the axis of the throat 32, the back suction tube 34 may be away from the platform 41, resulting in difficulty in sucking the droplets collected on the platform portion 41 back to the throat 32 through the back suction tube 34 when the carbon canister is desorbed.

After the Venturi tube 3 rotates 180 degrees about the axis of the back suction tube 34, the positions of the inlet segment 31 and the diffusion segment 33 are exchanged. After the positions thereof are exchanged, the inlet segment 31 and the diffusion segment 33 can be identical in structure, and the limiting portion 36 can still cooperate with the convex portions of the main body 1 and the end cover 2. Therefore, when mounting the Venturi tube 3, the Venturi tube 3 is convenient to assemble without identifying the inlet segment 31 and the diffusion segment 33. That is, the inlet segment 31 can be mounted on the main body 1 or the end cover 2, and the diffusion segment 33 can be mounted on the end cover 2 or the main body 1. For example, the inlet segment 31 and the diffusion segment 33 are each provided with two groove-shaped limiting portions 36, and a line connecting the two limiting portions 36 can be perpendicular to the axis of the back suction tube 34.

The inlet segment 31, the throat 32, the diffusion segment 33, and the back suction tube 34 can be integrally formed by injection molding, for example.

In other possible embodiments, the inlet segment 31 can be integrally formed with the main body 1 and/or the diffusion segment 33 can be integrally formed with the end cap 2.

The carbon canister disclosed in the present application has the following advantageous effects.

(1) The fuel droplets formed after cooling may be re-desorbed into the engine through the back suction tube for combustion, so that the fuel utilization is improved, and the exhaust emission of per unit of the fuel is reduced.

(2) For different vehicle models of the same platform, the carbon canister may be generalized in the case of the same size fuel tank. The same carbon canister may be used without considering the impact of the relative position between the carbon canister and the fuel tank on the size of the carbon canister, and thus the fabrication cost is reduced.

(3) Even the carbon canister of the present application disposed in the position lower than that of the fuel tank, the fuel droplets that forms after cooling may be avoided from contacting with activated carbon which causes the performance reduction of activated carbon. Therefore, compared with the existing carbon canister, it may reduce the use amount of carbon powder, the carbon canister has smaller volume and the cost of the carbon canister reduces.

(4) During desorption, the engine can suck gas through the back suction tube 34 apart from sucking gas from the fuel tank via carbon canister, which prevents the fuel tank from being deflated and deformed by continued sucking gas therefrom.

While the present application has been described in detail with reference to the above embodiments, it will be apparent to the skilled in the art that the present application is not limited to the embodiments described in the present specification. The present application can be modified and implemented as a modified embodiment without departing from the spirit and scope of the present application defined by the claims. Therefore, the description in this specification is for illustrative purposes and does not have any restrictive meaning to the present application.

LIST OF REFERENCE NUMERALS 1 main body
11 atmospheric communication port
12 first through hole
13 second through hole
2 end cap
21 absorption port
22 desorption port
3 Venturi tube
31 inlet segment
32 throat
33 diffusion segment
34 back suction tube
35 convex portion
36 limiting portion
4 cavity
41 platform portion

What is claimed is:

1. A carbon canister, comprising:
a main body formed with an activated carbon containing chamber containing activated carbon;
an end cover mounted to the main body, wherein the end cover and the main body enclose and thus form a cavity, and the end cover is provided with a desorption port which is used for connecting with an engine; and
a Venturi tube mounted in the cavity and comprising an inlet segment, a throat and a back suction tube, wherein an inner diameter of the throat is smaller than an inner diameter of the inlet segment, the inlet segment communicates with the activated carbon containing chamber, the throat communicates with the desorption port, the back suction tube connects to the throat, and the back suction tube extends to the bottom of the cavity.

2. The carbon canister of claim 1, wherein the Venturi tube further comprises a diffusion segment connected to the throat and the desorption port, the inner diameter of the throat is smaller than an inner diameter of the diffusion segment.

3. The carbon canister of claim 2, wherein the inlet segment, the throat and the diffusion segment extend in a straight line.

4. The carbon canister of claim 2, wherein an inner wall of the diffusion segment tapers into a truncated cone shape in a direction of an open end of the diffusion segment towards the throat.

5. The carbon canister of claim 2, wherein the Venturi tube is provided with a limiting portion which is located at the inlet segment and the diffusion segment, the limiting portion cooperates with the main body and the end cap to prevent the Venturi tube from rotating about an axis of the throat.

6. The carbon canister of claim 2, wherein the inlet segment and the diffusion segment are identical in structure after the Venturi tube is rotated 180 degrees about an axis of the back suction tube.

7. The carbon canister of claim 1, wherein an inner wall of the inlet segment tapers into a truncated cone shape in a direction of an open end of the inlet segment towards the throat.

8. The carbon canister of claim 1, wherein an inner wall of the back suction tube tapers into a truncated cone shape in a direction of an end of the back suction tube towards the throat.

9. The carbon canister of claim 1, wherein an inner diameter of the back suction tube is less than 1 mm at a position where the inner diameter of the back suction tube is the smallest.

10. The carbon canister of claim 1, wherein the end of the back suction tube is provided with a convex portion that extends toward a platform portion at the bottom of the cavity, so that a gap is formed between the end of the back suction tube and the platform portion.

* * * * *

UNITED STATES PATENT AND TRADEMARK OFFICE
CERTIFICATE OF CORRECTION

PATENT NO. : 11,506,152 B2
APPLICATION NO. : 17/472514
DATED : November 22, 2022
INVENTOR(S) : Zonghai Gong, Yongsheng Li and Hui Zhang It is certified that error appears in the above-identified patent and that said Letters Patent is hereby corrected as shown below:

On the Title Page

Add Item (30):
(30) Foreign Application Priority Data: September 10, 2020 (CN) 202021970520.2

Signed and Sealed this
Twenty-fifth Day of March, 2025

Coke Morgan Stewart
*Acting Director of the United States Patent and Trademark Office*